US011739998B2

United States Patent
Li

(10) Patent No.: US 11,739,998 B2
(45) Date of Patent: Aug. 29, 2023

(54) DEVICE AND METHOD FOR CHILLER PLANT MANAGEMENT, COMPUTER READABLE STORAGE DEVICE AND CHILLER PLANT

(71) Applicant: Carrier Corporation, Palm Beach Gardens, FL (US)

(72) Inventor: Sheng Li, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 167 days.

(21) Appl. No.: 17/058,391

(22) PCT Filed: Jul. 2, 2019

(86) PCT No.: PCT/US2019/040216
§ 371 (c)(1),
(2) Date: Nov. 24, 2020

(87) PCT Pub. No.: WO2020/014032
PCT Pub. Date: Jan. 16, 2020

(65) Prior Publication Data
US 2021/0199361 A1 Jul. 1, 2021

(30) Foreign Application Priority Data
Jul. 9, 2018 (CN) .......................... 201810745343.9

(51) Int. Cl.
*F25B 49/02* (2006.01)
*F25B 25/00* (2006.01)
*F25B 1/10* (2006.01)

(52) U.S. Cl.
CPC .......... *F25B 49/022* (2013.01); *F25B 25/005* (2013.01); *F25B 1/10* (2013.01); *F25B 2339/047* (2013.01); *F25B 2400/06* (2013.01)

(58) Field of Classification Search
CPC ........ F25B 49/022; F25B 25/005; F25B 1/00; F25B 2339/047; F25B 2400/06
See application file for complete search history.

(56) References Cited

U.S. PATENT DOCUMENTS 4,248,055 A 2/1981 Day et al.
4,562,531 A 12/1985 Enterline et al.
(Continued)

FOREIGN PATENT DOCUMENTS

CN 107796137 A 3/2018
WO 2007080994 A1 7/2007

OTHER PUBLICATIONS

AIRAH, "Innovations in Chiller Technology", Sep. 22, 2015, 26 pages.
(Continued)

*Primary Examiner* — Nael N Babaa
(74) *Attorney, Agent, or Firm* — Cantor Colburn LLP

(57) ABSTRACT

The present disclosure concerns a device and a method for chiller station management for providing chilled water to a load (30), a computer storage medium and a chiller station. The method for chiller station management includes: determining whether a chiller (10) with a low load exists in a chiller station and determining whether to allow to shut down one chiller (10) in the chiller station, when a certain chiller (10) in the chiller station transmits a surge risk signal; if yes, shutting down one chiller (10) in the chiller station to increase loads of other chillers (10); and if no, raising a chiller (10) outlet water temperature in the chiller station and/or lowering a cooling tower (20) outlet water temperature in the chiller station. The device and method for chiller station management according to the present disclosure provide a surge protection at a chiller station level, thereby effectively avoiding occurrence of surge in the chiller, and
(Continued)

improving the efficiency and operation stability of the chiller station.

18 Claims, 2 Drawing Sheets

(56) References Cited

U.S. PATENT DOCUMENTS

| | | | |
|---|---|---|---|
| 5,537,830 | A | 7/1996 | Goshaw et al. |
| 5,600,960 | A | 2/1997 | Schwedler et al. |
| 7,421,854 | B2 | 9/2008 | Shaffer et al. |
| 8,567,207 | B2 | 10/2013 | Sommer et al. |
| 9,217,592 | B2 | 12/2015 | Turney et al. |
| 9,423,172 | B2 | 8/2016 | Wong et al. |
| 2013/0328395 | A1 | 12/2013 | Krizman et al. |
| 2014/0229146 | A1 | 8/2014 | Gonzalez et al. |
| 2014/0358253 | A1 | 12/2014 | Tateishi et al. |
| 2015/0260441 | A1 | 9/2015 | Sibik |
| 2015/0345849 | A1 | 12/2015 | Sullivan et al. |
| 2017/0097005 | A1 | 4/2017 | Hossain et al. |

OTHER PUBLICATIONS

Carrier Corporation Commercial China, "Carrier ChillerVu: Plant System Manager", Available from: URL:https://www.carrier.com/commercial/en/cn/products/commercial-products/controls/carrier-chillervu-/,Accessed: Nov. 23, 2020, 2 pages.

International Search Report for International Application No. PCT/US2019/040216, International Filing Date Jul. 2, 2019, dated Oct. 29, 2019, 6 pages.

Written Opinion for International Application No. PCT/US2019/040216, International Filing Date Jul. 2, 2019, dated Oct. 29, 2019, 8 pages.

DEVICE AND METHOD FOR CHILLER PLANT MANAGEMENT, COMPUTER READABLE STORAGE DEVICE AND CHILLER PLANT

CROSS REFERENCE TO RELATED APPLICATIONS

This is a U.S. National Stage of Application No. PCT/US2019/040216, filed Jul. 2, 2019, which claims priority to Chinese Application No. 201810745343.9, filed on Jul. 9, 2018, the disclosures of which are incorporated herein by reference in their entireties.

FIELD OF THE INVENTION

The present disclosure relates to the field of chiller stations, and in particular to a method for chiller station management, a device for chiller station management in which the method for chiller station management is applied, and a chiller station.

BACKGROUND OF THE INVENTION

At present, chiller stations are used for providing chilled water to an air-water terminal for heat exchange, to manage the temperature of a building area. In response to a refrigeration capacity demand of the building area, the flow rate of chilled water or the flow rate of the air, which is supplied to the air-water terminal, can be adjusted to achieve a desired temperature of the area. The flow rate of the chilled water can be adjusted by controlling a state of an actuator at the terminal, such as the opening degree of a valve, and the flow rate of the air can be adjusted by controlling a state of an actuator at the terminal, such as the rotational speed of fan or the opening degree of an air valve.

Generally, a chiller station includes one or more chillers, cooling towers, pumps, and valves, which are connected via pipelines. The chillers can be divided into a centrifugal chiller, a screw chiller, and the like. Compared with the screw chiller, the centrifugal chiller has advantages of less weight and size, less footprint and large refrigeration capacity. However, the centrifugal chiller may have a surge when operating at a low load and a high condenser/evaporator temperature difference, which may affect the operation stability and efficiency of the centrifugal chiller. Therefore, a chiller control device of the centrifugal chiller itself is generally equipped with an anti-surge control strategy. For example, when a surge will occur or has occurred, hot gas bypass is activated or a compressor rotational speed is increased greatly for a variable speed compressor, which will sacrifice the efficiency of the chiller to maintain the stability and reliability of chiller operation. Even worse, the chiller control device may even force the chiller to shut down to avoid a further damage to the chiller when a surge has occurred. Therefore, surge protection is very important if the centrifugal chiller is adopted in the chiller station system.

SUMMARY OF THE INVENTION

The object of the present disclosure is to solve or at least alleviate the problems existing in the conventional technologies.

According to some features, an object of the present disclosure is to configure a surge protection control for a centrifugal chiller at an overall level of a chiller station.

According to some features, an object of the present disclosure is to provide an optimized surge protection control for a chiller station at an overall level.

According to some features, an object of the present disclosure is to avoid surge from occurring in a chiller so as to improve the operation stability and efficiency of a chiller station.

According to some aspects, a method for chiller station management is provided.

The method includes: determining whether a chiller with a low load exists in a chiller station and determining whether to allow to shut down one chiller in the chiller station, when a certain chiller in the chiller station transmits a surge risk signal; if yes, shutting down one chiller in the chiller station to increase loads of other chillers; and if no, raising a chiller outlet water temperature in the chiller station and/or lowering a cooling tower outlet water temperature in the chiller station.

Optionally, the method includes: shutting down one chiller in the chiller station in a case that a total load of N running chillers in the chiller station is less than $(N-1) \times 100a$ %, where a is a set coefficient ranging from 0 to 1.

Optionally, in the method, the step of raising a chiller outlet water temperature in the chiller station and/or lowering a cooling tower outlet water temperature in the chiller station includes:

raising a chilled water temperature set point CHWST_sp of a chiller control device of the chiller station by $\Delta$CHWST and/or lowering a cooling water temperature set point CWST_sp of a cooling tower control device of the chiller station by $\Delta$CWST.

Optionally, in the method, in a case that no surge risk signal is received, the chilled water temperature set point CHWST_sp of the chiller control device is updated according to a building load, and/or the cooling water temperature set point CWST_sp of the cooling tower control device is updated according to a wet-bulb temperature of an external environment.

Optionally, in the method, the increment $\Delta$CHWST of the chilled water temperature set point is a function of a compressor lift and a compressor rotational speed of the chiller having a surge risk.

Optionally, the method includes: dividing a coordinate system of the compressor lift and the compressor rotational speed into multiple regions; setting a chilled water temperature correction coefficient b for each of the regions, with the chilled water temperature correction coefficient b being determined by determining a position of the chiller having the surge risk in the coordinate system; and determining the increment $\Delta$CHWST of the chilled water temperature set point from the following formula:

$$\Delta\text{CHWST} = b \times \int_0^t \text{error}$$

where error represents a difference between the compressor lift of the chiller having the surge risk and a set safe lift threshold, and t represents time.

Optionally, in the method, the decrement $\Delta$CWST of the cooling water temperature set point is a function of the compressor lift and the compressor rotational speed of the chiller having the surge risk.

Optionally, the method includes: dividing a coordinate system of the compressor lift and the compressor rotational speed into multiple regions; setting a cooling water temperature correction coefficient c for each of the regions, with the cooling water temperature correction coefficient c being determined by determining a position of the chiller having the surge risk in the coordinate system; and determining the decrement ΔCWST of the cooling water temperature set point from the following formula:

$$\Delta CWST = c \times \int_0^t error$$

where error represents a difference between the compressor lift of the chiller having the surge risk and a set safe lift threshold, and t represents time.

Optionally, in the method, after the cooling water temperature set point CWST_sp is lowered, the cooling tower control device of the chiller station increases fan rotational speed of a cooling tower or activate more cooling towers.

In another aspect, a device for chiller station management is provided, which is configured to perform the method according to the embodiments of the present disclosure.

In another aspect, a computer readable storage medium is provided, in which computer programs are stored. When being executed, the computer programs perform the method according to the embodiments of the present disclosure.

In another aspect, a chiller station is provided. The chiller station includes:

one or more chillers controlled by respective chiller control devices;

a chilled water circuit passing through the one or more chillers and including a load;

a cooling water circuit passing through the one or more chillers and provided with one or more cooling towers controlled by a cooling tower control device; and a device for chiller station management, which interacts with the chiller control devices and the cooling tower control device, and is configured to: determine whether a chiller with a low load exists in the chiller station and determine whether to allow to shut down one chiller in the chiller station, when a certain chiller in the chiller station transmits a surge risk signal; if yes, shut down one chiller in the chiller station to increase loads of other chillers; and if no, raise a chiller outlet water temperature in the chiller station and/or lower a cooling tower outlet water temperature in the chiller station.

Optionally, in the above chiller station, the device for chiller station management is configured to shut down one chiller in the chiller station in a case that a total load of N running chillers in the chiller station is less than (N−1)×100a %, where a is a set coefficient.

Optionally, in the above chiller station, the device for chiller station management is configured to, in a case that any one of the chillers in the chiller station cannot be shut down, raise a chilled water temperature set point CHWST_sp of the chiller control device by ΔCHWST and/or lower a cooling water temperature set point CWST_sp of the cooling tower control device by ΔCWST.

Optionally, in the above chiller station, in a case that no surge risk signal is received, the device for chiller station management is configured to update the chilled water temperature set point CHWST_sp of the chiller control device according to a building load, and/or the device for chiller station management is configured to update the cooling water temperature set point CWST_sp of the cooling tower control device according to a wet-bulb temperature of the external environment.

Optionally, in the above chiller station, the increment ΔCHWST of the chilled water temperature set point is a function of a compressor lift and a compressor rotational speed of the chiller having a surge risk.

Optionally, in the above chiller station, the device for chiller station management is configured to: divide a coordinate system of the compressor lift and the compressor rotational speed into multiple regions; set a chilled water temperature correction coefficient b for each of the regions, with the chilled water temperature correction coefficient b being determined by determining a position of the chiller having the surge risk in the coordinate system; and determine the increment ΔCHWST of the chilled water temperature set point from the following formula:

$$\Delta CHWST = b \times \int_0^t error$$

where error represents a difference between the compressor lift of the chiller having the surge risk and a set safe lift threshold, and t represents time.

Optionally, in the above chiller station, the decrement ΔCWST of the cooling water temperature set point is a function of the compressor lift and the compressor rotational speed of the chiller having the surge risk.

Optionally, in the above chiller station, a coordinate system of the compressor lift and the compressor rotational speed is divided into multiple regions; a cooling water temperature correction coefficient c is set for each of the regions, with the cooling water temperature correction coefficient c being determined by determining a position of the chiller having the surge risk in the coordinate system; and the decrement ΔCWST of the cooling water temperature set point is determined from the following formula:

$$\Delta CWST = c \times \int_0^t error$$

where error represents a difference between the compressor lift of the chiller having the surge risk and a set safe lift threshold, and t represents time.

Optionally, in the above chiller station, after the cooling water temperature set point CWST_sp is lowered, the cooling tower control device of the chiller station increases fan rotational speed of a cooling tower or activate more cooling towers.

The device and method for chiller station management according to the embodiments of the present disclosure provide surge protection at the chiller station level, thereby effectively avoiding occurrence of surge in the chiller, and improving the efficiency and operation stability of the chiller station.

BRIEF DESCRIPTION OF THE DRAWINGS

The contents of the present disclosure will become more easily understood with reference to the accompanying drawings. Those skilled in the art can readily appreciate that the drawings are for illustrative purposes only, instead of being intended to limit the scope of protection of the present disclosure. In addition, similar numbers in the drawings are used to indicate similar parts, wherein.

DETAILED DESCRIPTION OF THE EMBODIMENT(S) OF THE INVENTION

It will be readily understood that, based on the technical solutions of the present disclosure, those skilled in the art can propose various alternative structures and implementations without departing from the true spirit of the present disclosure. Therefore, the following detailed description and the accompanying drawings are merely exemplary description of the technical solutions of the present disclosure, which shall not be deemed as the whole of the present disclosure or as limiting or restricting the technical solutions of the present disclosure.

Such orientation terms as upper, lower, left, right, front, rear, front side, back side, top, bottom and so on that are mentioned or may be mentioned in this description are defined with respect to the configurations shown in the individual drawings. They are relative concepts and thus possibly vary according to their different locations and different usage states. Therefore, these or other orientation terms shall not be interpreted as limiting terms.

Figure 1:
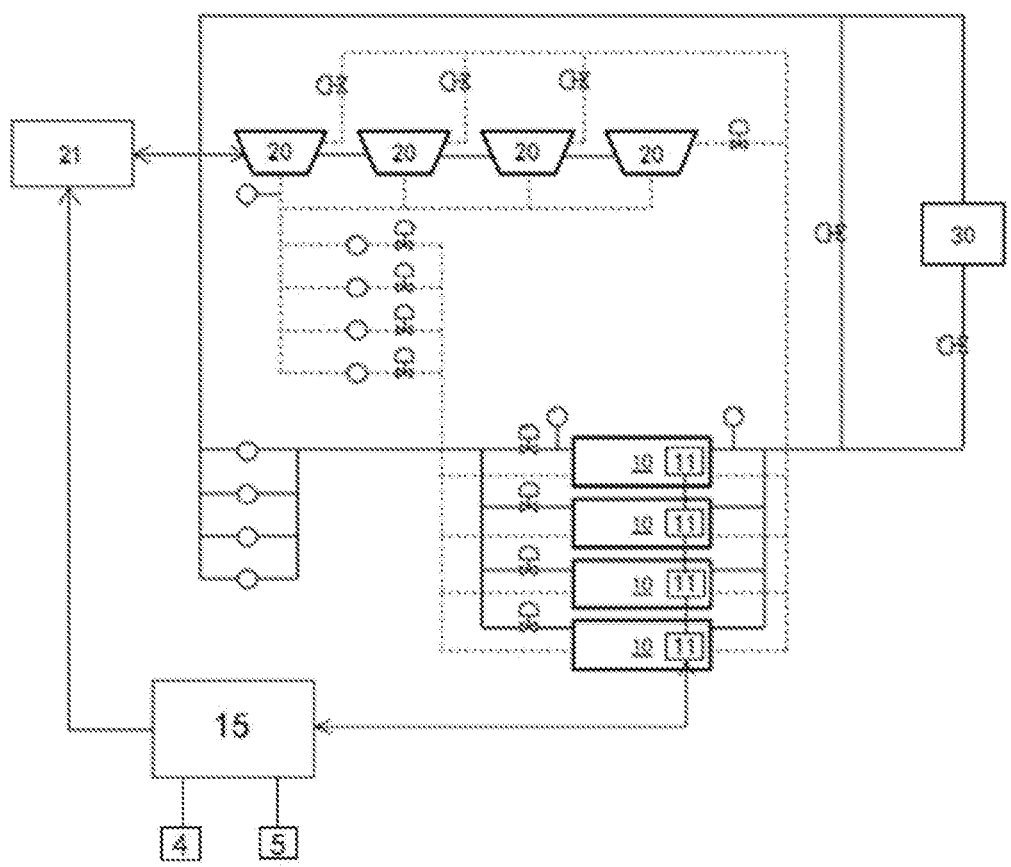
FIG. 1 is a schematic structural diagram of a chiller station according to an embodiment of the present disclosure.

FIG. 1 shows a schematic structural diagram of a chiller station according to an embodiment of the present disclosure. The chiller station includes multiple chillers 10 (four chillers are shown in the figure). The chillers 10 are controlled by respective chiller control devices 11 which may be provided with surge protection control strategies. For example, when a surge will occur or has occurred, hot gas bypass can be activated or a compressor rotational speed can be increased greatly for a variable speed compressor, or the chiller may even be shut down. The chiller station further includes a chilled water circuit indicated by solid lines in the figure. The chilled water circuit passes through multiple chillers 10 and includes a load 30. The chiller station further includes a cooling water circuit indicated by dashed lines in the figure, and multiple cooling towers 20 are disposed in the cooling water circuit. The cooling towers 20 are controlled by cooling tower control devices 21. When the chiller station is in operation, cooling water and chilled water exchange heat at the multiple chillers 10. On one hand, the chilled water provides a refrigeration effect to the load 30 to adjust the temperature of a building area. On the other hand, the cooling water dissipates heat to the surrounding environment through the cooling towers 20. The chiller station further includes a device 15 for chiller station management which interacts with the chiller control device 11. Specifically, the device 15 for chiller station management may know about a specific operating state of the chiller from the chiller control device 11, such as a compressor lift, a compressor rotational speed and a cooling water temperature set point of the chiller. In addition, the device 15 for chiller station management can receive a surge risk signal from the chiller control device 11. Furthermore, the device 15 for chiller station management can be further set with a chilled water temperature set point for the chiller control device 11. The device 15 for chiller station management can further interact with the cooling tower control device 21. For example, the device 15 for chiller station management may know about an operating state of the cooling tower from the cooling tower control device 21, such as fan rotational speed of the cooling tower, open state of the cooling tower, and the cooling water temperature set point. Besides, the device 15 for chiller station management may be further set with a cooling water temperature set point or the like for the cooling tower control device 21.

Figure 2:
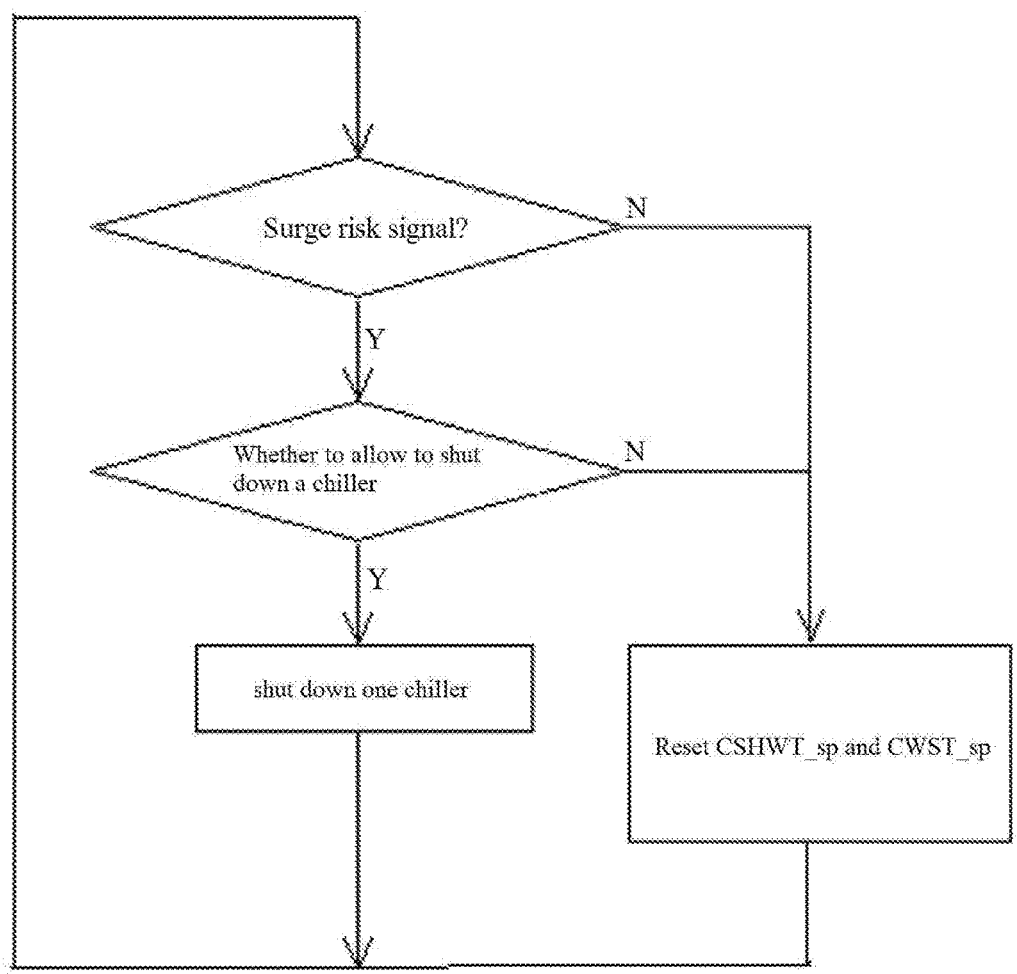
FIG. 2 is a logic diagram of a method for chiller station management according to an embodiment of the present disclosure.

In the embodiment of the present disclosure, the device 15 for chiller station management is configured to configure an anti-surge control for a centrifugal chiller at an overall level of the chiller station, to avoid occurrence of surge in the chiller 10. Reference is made to FIG. 2, which shows a control logic diagram of the device 15 for chiller station management. The device 15 for chiller station management is configured to: determine whether a chiller with a low load exists in the chiller station and determine whether to allow to shut down one chiller in the chiller station, when a certain chiller in the chiller station transmits a surge risk signal; if yes, shut down one chiller in the chiller station to increase loads of other chillers; if no, raise a chiller outlet water temperature in the chiller station and/or lower a cooling tower outlet water temperature in the chiller station.

In some embodiments, the device for chiller station management determines whether to allow to shut down the chiller in consideration of whether a condition that a total load of N running chillers in the chiller station is less than $(N-1) \times 100a$ % is met, where a is a set coefficient ranging from 0 to 1. One of the chillers in the chiller station is shut down, only if the condition is met. For example, when $N=2$ and a is equal to 0.8, that is, if there are two chillers running and the sum of their loads is less than 80%, e.g., if the two chillers are running under a load of 40% respectively, it may be considered to shut down one of the chillers so that the other one of the chillers operates under a load of 80%. In this way, a surge of the chiller caused by a low load is avoided.

In some embodiments, if it is determined that one of the chillers in the chiller station should not be shut down, for example, when two chillers each operate under a load of 60%, or for example, when only one chiller is equipped in the system, or for example, when there is currently only one chiller running in the system, then if one chiller is shut down, the total load demand cannot be met. Therefore, the burden on the compressor of the chiller is reduced by raising a chiller outlet water temperature in the chiller station or lowering a cooling tower outlet water temperature in the chiller station, to prevent the chiller from a surge. In some embodiments, the device 15 for chiller station management is configured to increase the chilled water temperature set point CHWST_sp of the chiller control device 11 by $\Delta$CHWST, i.e., the updated chilled water temperature set point CHWST_sp'=CHWST_sp+$\Delta$CHWST; and/or, lower the cooling water temperature set point CWST_sp of the cooling tower control device 21 by $\Delta$CWST, i.e., the updated cooling water temperature set point CWST_sp'=CWST_sp−$\Delta$CWST. An inlet pressure of a chiller compressor can be increased by raising the chilled water temperature set point, while an outlet pressure of the chiller compressor can be reduced by lowering the cooling water temperature set point. Both the ways can effectively reduce the compressor lift, thereby avoiding occurrence of surge in the chiller. The compressor lift represents the compression capacity of the compressor, which is expressed as a pressure ratio of the inlet pressure and the outlet pressure of the compressor, or a difference between an inlet pressure and an outlet pressure of the compressor or a refrigerant saturation temperature difference, or the like. As the compressor lift increases, the burden on the compressor is increased and a surge is more prone to occurrence.

Figure 3:
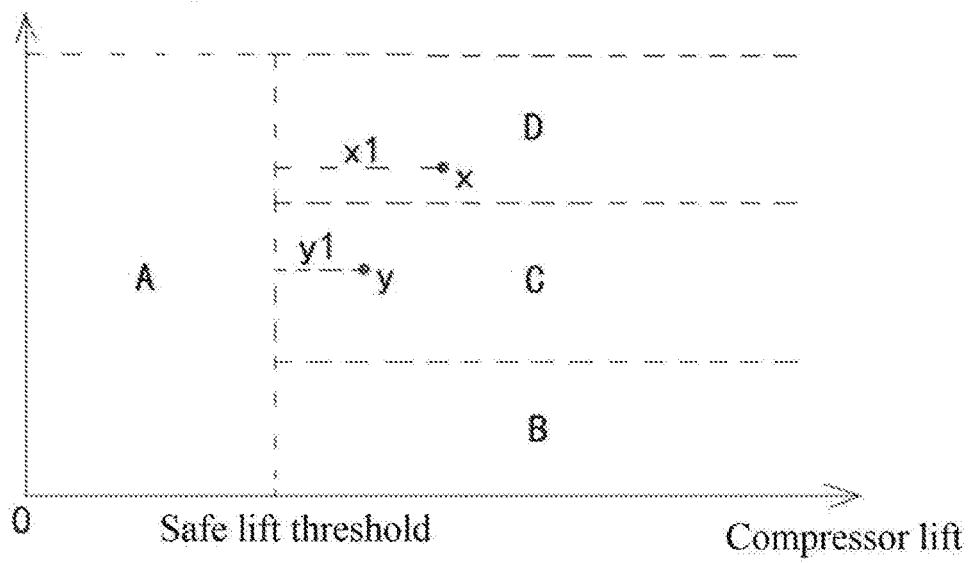
FIG. 3 is a diagram showing coordinates of a compressor lift and a compressor rotational speed, and a division thereof.

In some embodiments, the increment $\Delta$CHWST of the chilled water temperature set point is a function of a compressor lift and a compressor rotational speed of a chiller having a surge risk. Reference is made to FIG. 3, which shows coordinates of the compressor lift and compressor rotational speed of the chiller. In some embodiments, a coordinate system of the compressor lift and the compressor rotational speed is divided into multiple regions, and a chilled water temperature correction coefficient b is preset for each of the regions. The chilled water temperature correction coefficient b is determined by determining a position of a compressor having a surge risk in the coordinate system. The increment ΔCHWST of the chilled water temperature set point can be obtained from the following formula:

$$\Delta CHWST = b \times \int_0^t error.$$

In this formula, error represents a difference between a compressor lift of the chiller having the surge risk and a set safe lift threshold, and t represents time. In this adjustment mode, the increment ΔCHWST of the chilled water temperature set point is a function of time t, thereby achieving a dynamic adjustment of the increment ΔCHWST of the chilled water temperature set point.

In some embodiments, the decrement ΔCWST of the cooling water temperature set point is a function of a compressor lift and a compressor rotational speed of a chiller having a surge risk. Similarly, a coordinate system of the compressor lift and the compressor rotational speed is divided into multiple regions, and a cooling water temperature correction coefficient c is preset for each of the regions. The cooling water temperature correction coefficient c is determined by determining a position of a compressor having a surge risk in the coordinate system. The decrement ΔCWST of the cooling water temperature set point can be obtained from the following formula:

$$\Delta CWST = c \times \int_0^t error.$$

In this formula, error represents a difference between a compressor lift of the chiller having the surge risk and a set safe lift threshold, and t represents time. In this mode, a dynamic adjustment of the decrement ΔCWST of the cooling water temperature set point is achieved.

With continued reference to FIG. 3, a division of a coordinate system of a compressor lift and a compressor rotational speed according to an embodiment is shown. In this embodiment, the coordinate system of a compressor lift and a compressor rotational speed is divided into four regions A, B, C and D. A portion where the compressor lift is less than the safe lift threshold is defined as region A. A chilled water temperature correction coefficient $b_1$ corresponding to region A may take a small value since a surge occurrence probability in region A is low. In addition, a portion where the compressor lift is greater than the safe lift threshold is defined as three regions B, C and D based on different compressor rotational speeds. As the compressor rotational speed increases, a surge protection capability of a controller of the chiller itself after a surge occurs is reduced, that is, the risk of surge is increased. Therefore, the increment of the chilled water temperature set point should be increased. A chilled water temperature correction coefficient $b_2$ corresponding to region B is less than a chilled water temperature correction coefficient $b_3$ corresponding to region C, and the chilled water temperature correction coefficient $b_3$ corresponding to region C is less than a chilled water temperature correction coefficient $b_4$ corresponding to region D. That is, $b_1 < b_2 < b_3 < b_4$. It should be understood that, a value of the chilled water temperature correction coefficient b corresponding to each of the regions can be determined through experiments. As an example, if a chiller state is at position y in the coordinate system, then $\Delta CHWST = b_3 \times \int_0^t y_1$. In addition, if the chiller state is at position x in the coordinate system, then $\Delta CHWST = b_4 \times \int_0^t x_1$.

A similar principle can be applied to the cooling water temperature correction coefficient c. It should be understood that, although the chilled water temperature correction coefficient b and the cooling water temperature correction coefficient c have the same region division in the embodiment illustrated in FIG. 3, they may have different region divisions in alternative embodiments, and the region division is not limited to that in the embodiment shown in the figure.

In some embodiments, after the cooling water temperature set point CWST_sp is lowered, the cooling tower control device 21 of the chiller station may increase fan rotational speed of the cooling tower 20 or activate more cooling towers 20.

In some embodiments, as shown in FIG. 1, in a case that no surge risk signal is received, the device 15 for chiller station management may be further configured to update the chilled water temperature set point CHWST_sp of the chiller control device 11 of the chiller station according to a building load 4. For example, when the building load is lowered, the chilled water temperature set point CHWST_sp of the chiller may be increased appropriately, so as to improve the efficiency of the chiller and reduce energy consumption of the chiller. In some embodiments, the device 15 for chiller station management may further update the cooling water temperature set point CWST_sp of the cooling tower control device according to the wet-bulb temperature of the external environment. For example, a difference between the cooling water temperature set point CWST_sp and the wet-bulb temperature of the external environment can be kept constant.

In another aspect, a method for chiller station management is further provided according to the present disclosure. The method includes:

determining whether a chiller with a low load exists in a chiller station and whether to allow to shut down one chiller in the chiller station, when a certain chiller in the chiller station transmits a surge risk signal; if yes, shutting down one chiller in the chiller station to increase loads of other chillers; and if no, raising a chiller outlet water temperature in the chiller station and/or lowering a cooling tower outlet water temperature in the chiller station.

In another aspect, a device for chiller station management is provided, which performs the method according to the embodiments of the present disclosure.

In another aspect, a computer readable storage medium is provided, in which computer programs are stored. When being executed, the computer programs perform the method according to the embodiments of the present disclosure.

The specific embodiments described above are merely for describing the principle of the present disclosure more clearly, and various components are clearly illustrated or depicted to make it easier to understand the principle of the present disclosure. Those skilled in the art can readily make various modifications or changes to the present disclosure without departing from the scope of the present disclosure. It should be understood that these modifications or changes should be included within the scope of protection of the present disclosure.

What is claimed is:

1. A method for chiller station management, comprising:
   determining that a chiller with a low load exists in a chiller station and determining to not allow to shut down one chiller in the chiller station, when a certain chiller in the chiller station transmits a surge risk signal; and
   the method comprises at least one of raising a chiller outlet water temperature in the chiller station and lowering a cooling tower outlet water temperature in the chiller station;
   wherein raising the chiller outlet water temperature in the chiller station includes raising a chilled water temperature set point CHWST_sp of a chiller controller of the chiller station by ΔCHWST; and lowering the cooling tower outlet water temperature in the chiller station includes lowering a cooling water temperature set point CWST_sp of a cooling tower controller of the chiller station by ΔCWST.

2. The method for chiller station management according to claim 1, further comprising:
determining to allow to shut down one chiller in the chiller station; and
shutting down one chiller in the chiller station in a case that a total load of N running chillers in the chiller station is less than (N−1)×100a %, where a is a set coefficient ranging from 0 to 1.

3. The method for chiller station management according to claim 1, wherein in a case that no surge risk signal is received, at least one of the chilled water temperature set point CHWST_sp of the chiller controller is updated according to a building load, and the cooling water temperature set point CWST_sp of the cooling tower controller is updated according to a wet-bulb temperature of an external environment.

4. The method for chiller station management according to claim 1, wherein the increment ΔCHWST of the chilled water temperature set point is a function of a compressor lift and a compressor rotational speed of the chiller.

5. The method for chiller station management according to claim 4, further comprising:
dividing a coordinate system of the compressor lift and the compressor rotational speed into multiple regions;
setting a chilled water temperature correction coefficient b for each of the regions, with the chilled water temperature correction coefficient b being determined by determining a position of the chiller in the coordinate system; and
determining the increment ΔCHWST of the chilled water temperature set point from the following formula:

$$\Delta CHWST = b \times \int_0^t error$$

where error represents a difference between the compressor lift of the chiller and a set safe lift threshold, and t represents time.

6. The method for chiller station management according to claim 1, wherein the decrement ΔCWST of the cooling water temperature set point is a function of the compressor lift and the compressor rotational speed of the chiller.

7. The method for chiller station management according to claim 6, further comprising:
dividing a coordinate system of the compressor lift and the compressor rotational speed into multiple regions;
setting a cooling water temperature correction coefficient c for each of the regions, with the cooling water temperature correction coefficient c being determined by determining a position of the chiller in the coordinate system; and
determining the decrement ΔCWST of the cooling water temperature set point from the following formula:

$$\Delta CWST = c \times \int_0^t error$$

where error represents a difference between the compressor lift of the chiller and a set safe lift threshold, and t represents time.

8. The method for chiller station management according to claim 7, wherein after the cooling water temperature set point CWST_sp is lowered, the cooling tower controller of the chiller station increases fan rotational speed of a cooling tower or activate more cooling towers.

9. A device for chiller station management, wherein the device for chiller station management performs the method according to claim 1.

10. A computer readable storage medium, in which computer programs are stored, wherein, when being executed, the computer programs perform the method according to claim 1.

11. A chiller station, comprising:
one or more chillers controlled by respective chiller controllers;
a chilled water circuit passing through the one or more chillers and comprising a load;
a cooling water circuit passing through the one or more chillers and provided with one or more cooling towers controlled by a cooling tower controller; and
a device for chiller station management, which interacts with one of the one or more respective chiller controllers and the cooling tower controller, and is configured to:
determine that a chiller with a low load exists in the chiller station and determine to not allow to shut down one chiller in the chiller station, when a certain chiller in the chiller station transmits a surge risk signal;
at least one of raise a chiller outlet water temperature in the chiller station and lower a cooling tower outlet water temperature in the chiller station;
wherein raising the chiller outlet water temperature in the chiller station includes raising a chilled water temperature set point CHWST_sp of one of the chiller controllers of the chiller station by ΔCHWST; and
lowering the cooling tower outlet water temperature in the chiller station includes lowering a cooling water temperature set point CWST_sp of a cooling tower controller of the chiller station by ΔCWST.

12. The chiller station according to claim 11, wherein the device for chiller station management is configured to
determine to allow to shut down one chiller in the chiller station; and
shut down one chiller in the chiller station in a case that a total load of N running chillers in the chiller station is less than (N−1)×100a %, where a is a set coefficient ranging from 0 to 1.

13. The chiller station according to claim 11, wherein in a case that no surge risk signal is received, the device for chiller station management is configured to at least one of update the chilled water temperature set point CHWST_sp of the chiller controller according to a building load and update the cooling water temperature set point CWST_sp of the cooling tower controller according to a wet-bulb temperature of the external environment.

14. The chiller station according to claim 11, wherein the increment ΔCHWST of the chilled water temperature set point is a function of a compressor lift and a compressor rotational speed of the chiller.

15. The chiller station according to claim 14, wherein the device for chiller station management is configured to:
divide a coordinate system of the compressor lift and the compressor rotational speed into multiple regions;
set a chilled water temperature correction coefficient b for each of the regions, with the chilled water temperature correction coefficient b being determined by determining a position of the chiller in the coordinate system; and determine the increment ΔCHWST of the chilled water temperature set point from the following formula:

ΔCHWST=$b \times \int_0^t$error where error represents a difference between the compressor lift of the chiller and a set safe lift threshold, and t represents time.

16. The chiller station according to claim 11, wherein the decrement ΔCWST of the cooling water temperature set point is a function of the compressor lift and the compressor rotational speed of the chiller.

17. The chiller station according to claim 16, wherein the device for chiller station management is configured to:
divide a coordinate system of the compressor lift and the compressor rotational speed into multiple regions;
set a cooling water temperature correction coefficient c for each of the regions, with the cooling water temperature correction coefficient c being determined by determining a position of the chiller in the coordinate system; and
determine the decrement ΔCWST of the cooling water temperature set point from the following formula:

ΔCWST=$c \times \int_0^t$error where error represents a difference between the compressor lift of the chiller and a set safe lift threshold, and t represents time.

18. The chiller station according to claim 11, wherein after the cooling water temperature set point CWST_sp is lowered, the cooling tower controller of the chiller station increases fan rotational speed of a cooling tower or activate more cooling towers.

\* \* \* \* \*